United States Patent
Jung et al.

(10) Patent No.: US 8,379,050 B2
(45) Date of Patent: Feb. 19, 2013

(54) RENDERING APPARATUS, METHOD AND MEDIUM

(75) Inventors: Seok-yoon Jung, Seoul (KR); Sang-duk Kim, Seoul (KR); Il-san Kim, Seoul (KR); Jae-ho Nah, Seoul (KR); Woo-chan Park, Seoul (KR); Tack-don Han, Seoul (KR)

(73) Assignees: Samsung Electronics Co., Ltd., Suwon-si (KR); Yonsei University Industry Foundation, Seoul (KR)

( * ) Notice: Subject to any disclaimer, the term of this patent is extended or adjusted under 35 U.S.C. 154(b) by 885 days.

(21) Appl. No.: 11/889,629

(22) Filed: Aug. 15, 2007

(65) Prior Publication Data

US 2008/0106551 A1 May 8, 2008

(30) Foreign Application Priority Data

Nov. 8, 2006 (KR) ........................ 10-2006-0110223

(51) Int. Cl.
*G06T 15/40* (2006.01)
*G06T 15/50* (2006.01)
*G09G 5/00* (2006.01)

(52) U.S. Cl. ......... 345/614; 345/582; 345/422; 345/426
(58) Field of Classification Search .................. 345/419, 345/422, 426, 582, 614, 545, 552
See application file for complete search history.

(56) References Cited

U.S. PATENT DOCUMENTS

| 5,798,770 | A * | 8/1998 | Baldwin | 345/506 |
| 6,891,533 | B1 * | 5/2005 | Alcorn et al. | 345/419 |
| 7,068,272 | B1 | 6/2006 | Voorhies et al. | |
| 2004/0061699 | A1 | 4/2004 | Tjew | |
| 2005/0195198 | A1 | 9/2005 | Anderson et al. | |

FOREIGN PATENT DOCUMENTS

| JP | 2005-228320 | 8/2005 |
| KR | 10-2004-0011918 | 2/2004 |
| KR | 10-2005-0031207 | 4/2005 |
| WO | 03/046836 | 6/2003 |
| WO | 03/046869 | 6/2003 |

OTHER PUBLICATIONS

Greene et al., "Hierarchical Z-Buffer Visibility", Published Aug. 1993, pp. 7 (in English).
Korean Office Action mailed Feb. 24, 2012 issued in corresponding Korean Patent Application No. 10-2006-0110223.
Emmett Kilgariff et al., "The GeForce 6 Series GPU Architecture", GPU Gems 2, 2005, pp. 471-492.
Korean Office Action dated Feb. 24, 2012 issued in corresponding Korean Patent Application No. 10-2006-0110223.
Emmett Kilgariff et al., "The GeForce 6 Series GPU Architecture", GPB Gems 2, 2005, pp. 471-492.
Woo-Chan Park et al., "An Effective Pixel Rasterization Pipeline Architecture for 3D Rendering Processors", IEEE Transactions on Computers, vol. 52, No. 11, Nov. 2003, pp. 1501-1508.

(Continued)

*Primary Examiner* — Hau Nguyen
(74) *Attorney, Agent, or Firm* — Staas & Halsey LLP (57) ABSTRACT

A rendering method, medium and apparatus for sequentially performing one or more third raster operations to test whether a fragment can be displayed as a pixel after sequentially performing one or more second raster operations to test whether the fragment can be displayed as the pixel, so as to provide efficient power consumption and rapid completion of rendering.

13 Claims, 3 Drawing Sheets

OTHER PUBLICATIONS

Joel McCormack et al., "Neon: A Single-Chip 3D Workstation Graphics Accelerator", Workshop on Graphics Hardware Lisbon Portugal, 1998, pp. 123-132.

Steve Morein et al., "ATI Radeon HyperZ Technology", In Graphics Hardware Workshop, 2000, pp. 1-21.

* cited by examiner

RENDERING APPARATUS, METHOD AND MEDIUM

CROSS-REFERENCE TO RELATED APPLICATIONS

This application claims the benefit of Korean Patent Application No. 10-2006-0110223, filed on Nov. 8, 2006, in the Korean Intellectual Property Office, the disclosure of which is incorporated herein in its entirety by reference

BACKGROUND

1. Field

One or more embodiments of the present invention relate to rendering, and more particularly, to a 3D graphics accelerator supporting a pipeline structure which is not programmable, that is, a fixed function pipeline structure.

2. Description of the Related Art

A conventional rendering apparatus supporting a fixed function pipeline structure performs a number of fixed graphics operations on each of a plurality of fragments generated for every plane formed of a plurality of vertices in order to perform rendering (that is, visualization) on a model constructed with the plurality of vertices. In this case, the graphics operation may be an operation of displaying fragments as pixels such as when texture mapping, or an operation of testing whether the fragments can be displayed as pixels such as when performing a depth test. Here, texture mapping denotes mapping information on quality and texture of a 2D image to a fragment, and performing a depth test denotes testing whether a fragment to be displayed can be displayed as a pixel by comparing a depth value of the fragment and a depth value matched to a displayable position of the fragment.

The conventional rendering apparatus, and more particularly, a rendering apparatus supporting a fixed function pipeline structure according to an open graphics library (OpenGL) proposed by the OpenGL architecture review board performs graphics operations of testing whether fragments can be displayed as pixels, after performing one or more graphics operations of displaying fragments as pixels. Accordingly, the conventional rendering apparatus performs unnecessary graphics operations of displaying fragments to be tested as pixels, that ultimately cannot be displayed as pixels. This creates a problem in that efficient power consumption and rapid completion of rendering are difficult to achieve. The problem can increase when the conventional rendering apparatus performs a graphics operation, such as texture mapping, that has a large operation capacity to display fragments as pixels.

SUMMARY

One or more embodiments of the present invention relate to a rendering apparatus supporting a fixed function pipeline structure that does not perform a graphics operation, such as displaying fragments as pixels, for fragments to be tested that cannot ultimately be displayed as pixels.

One or more embodiments of the present invention also relate to a rendering method supporting a fixed function pipeline structure that does not perform a graphics operation, such as displaying fragments as pixels, for fragments to be tested that cannot ultimately be displayed as pixels.

One or more embodiments of the present invention also relate to a computer-readable medium having embodied thereon a computer program for executing a rendering method.

Additional aspects and/or advantages will be set forth in part in the description which follows and, in part, will be apparent from the description, or may be learned by practice of the invention.

To achieve at least the above and/or other aspects and advantages, embodiments of the present invention include a rendering apparatus comprising: a tester performing one or more operations from among first raster operations and second raster operations testing whether a fragment can be displayed as a pixel; and a fragment processor performing one or more of third raster operations for displaying the fragment as the pixel, wherein the first, second, and third raster operations to be performed are sequentially performed, and the second raster operations are performed in advance of the first and third raster operations.

To achieve at least the above and/or other aspects and advantages, embodiments of the present invention include a rendering method comprising: (a) sequentially performing one or more second raster operations testing whether a fragment can be displayed as a pixel; and (b) after (a) is performed, sequentially performing one or more raster operations selected from among a plurality of first raster operations testing whether the fragment can be displayed as the pixel and third raster operations for displaying the fragment as the pixel.

To achieve at least the above and/or other aspects and advantages, embodiments of the present invention include at least one medium comprising computer readable code to control at least one processing element to implement a method, wherein the method comprises: (a) sequentially performing one or more second raster operations of testing whether a fragment can be displayed as a pixel; and (b) after (a) is performed, sequentially performing one or more from among first raster operations of testing whether the fragment can be displayed as the pixel and third raster operations for displaying the fragment as the pixel.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to the like elements throughout. Embodiments are described below to explain the present invention by referring to the figures.

Figure 1:
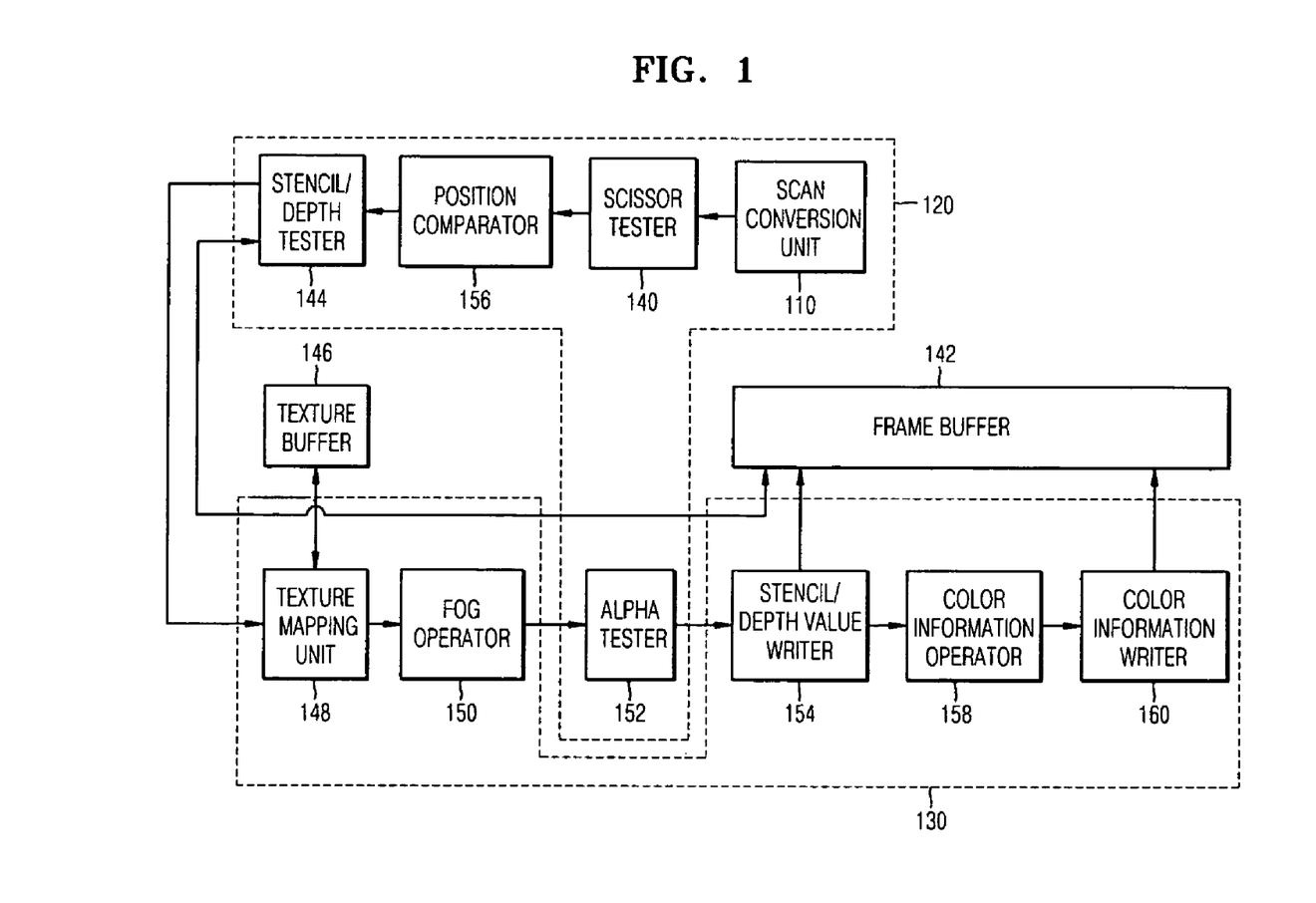
FIG. 1 illustrates a rendering apparatus, according to an embodiment of the present invention.

FIG. 1 illustrates a rendering apparatus, according to an embodiment of the present invention. The rendering apparatus may include, for example, a scan conversion unit 110, a tester 120, a fragment processor 130, a texture buffer 146, and a frame buffer 142.

Here, the tester 120 may include, for example, a scissor tester 140, a position comparator 156, a stencil/depth tester 144, and an alpha tester 152. In this case, the scissor tester 140 and the alpha tester 152 may be selectively included in the tester 120. Hereinafter, for convenience of description, it may be assumed that the tester 120 includes the scissor tester 140, the position comparator 156, the stencil/depth tester 144, and the alpha tester 152, noting that alternative implementations are equally available.

The fragment processor 130 may include, for example, a texture mapping unit 148, a fog operator 150, a stencil/depth value writer 154, a color information operator 158, and a color information writer 160. Here, the fog operator 150 may be selectively provided to the fragment processor 130. Hereinafter, for convenience of description, it may be assumed that the fragment processor 130 includes the texture mapping unit 148, the fog operator 150, the stencil/depth value writer 154, the color information operator 158, and the color information writer 160, noting that alternative implementations are equally available.

The rendering apparatus according to an embodiment may support a pipeline structure as shown in FIG. 1. For example, the scissor tester 140 may operate after the scan conversion unit 110 operates, the position comparator 156 may operate after the scissor tester 140 operates, the stencil/depth tester 144 may operate after the position comparator 156 operates, the texture mapping unit 148 may operate after the stencil/depth tester 144 operates, and the fog operator 150 may operate after the texture mapping unit 148 operates. Similarly, the alpha tester 152 may operate after the fog operator 150 operates, the stencil/depth value writer 154 may operate after the alpha tester 152 operates, the color information operator 158 may operate after the stencil/depth value writer 154 operates, and the color information writer 160 may operate after the color information operator 158 operates. Accordingly, as shown in FIG. 1, a pipeline (hereinafter, referred to as a pixel pipeline) including, for example, 9 operations from the scissor tester 140 to the color information writer 160 may be constructed. Here, a first operation may refer to an operation of the scissor tester 140, and a ninth operation may refer to an operation of the color information writer 160, noting that alternative implementations and orders are equally available.

The pipeline structure supported by the rendering apparatus according to an embodiment may be a fixed function pipeline structure. Therefore, the pipeline structure supported by the rendering apparatus according to an embodiment may not be changed any further.

The scan conversion unit 110 may generate a plurality of fragments for every plane formed of vertices, thereby constructing graphic data to be rendered. Here, each vertex may have position information and color information, and each fragment may have, for example, information on a position of a pixel on a screen corresponding to the fragment, a depth value of the pixel corresponding to the fragment, information on a color of the pixel corresponding to the fragment, and information on one or more texture coordinates corresponding to the fragment. The fragment may be considered to be a pixel only when written in the frame buffer 142, which will be described later, and only when a display unit (not shown) such as a liquid crystal display (LCD) displays the written pixel on a screen of the display unit. Therefore, in the description, the pixel corresponding to the fragment may refer to a fragment that is assumed to be written in the frame buffer 142, the screen may refer to the screen provided to the display unit, and the texture coordinates may refer to coordinates on a texture image that is a 2D image showing quality and texture.

The generated fragments may be sequentially input to the pixel pipeline. Accordingly, when performing a $p_{th}$ (where p is a natural number) operation of the pixel pipeline on a $q_{th}$ (where q is a natural number) fragment input to the pixel pipeline is completed, the $p_{th}$ operation may be performed on a $(q+1)_{th}$ fragment input to the pixel pipeline. For example, when the scissor tester 140 operates on a sixth input fragment and completes the operation, the sixth input fragment may be input to the position comparator 156, and the scissor tester 140 may then operate on a seventh input fragment. Similarly, the texture mapping unit 148 may operate on a second input fragment and complete the operation, the second input fragment may be input to the fog operator 150, and the texture mapping unit 148 may then operate on a third input fragment.

Detailed operations of the pixel pipeline will now be described.

The tester 120 may perform at least one of first raster operations and second raster operations. Hereinafter, the first and second raster operations may mean operations testing whether a fragment can be displayed as a pixel. Referring to FIG. 1, an operation of the alpha tester 152 may be the first raster operation, and operations of the scissor tester 140, the position comparator 156, and the stencil/depth tester 144 may be the second raster operations.

The fragment processor 130 may perform at least one third raster operation. In the description, the third raster operation may refer to an operation for displaying a fragment as a pixel. Operations of the texture mapping unit 148, the fog operator 150, the stencil/depth value writer 154, the color information operator 158, and the color information writer 160 may be the third raster operations.

The rendering apparatus, according to an embodiment, firstly performs the second raster operations than any other first raster operations. Similarly, the rendering apparatus, according to an embodiment, firstly performs the second raster operations than any other third raster operations.

Detailed description of the tester 120 and the fragment processor 130 is given in reference to operations performed from the scissor tester 140 to the color information writer 160.

The scissor tester 140 may perform a scissor test on a fragment input to the scissor tester 140. Here, the scissor test may refer to testing whether or not a position of a pixel corresponding to the fragment exists in a predetermined region of the screen. Here, the predetermined region may refer to any region displaying pixels. Namely, the display method (not shown) may not display pixels outside the predetermined region. The fragment input to the scissor tester 140 may be the fragment input from the scan conversion unit 110. Namely, the scissor test may be the first of several operations performed in the pixel pipeline.

When the testing shows that the position of the pixel corresponding to the fragment exists in the predetermined region, that is, when the fragment passes the scissor test, the scissor tester 140 may output the input fragment to the position comparator 156.

On the other hand, when the testing shows that the position of the pixel corresponding to the fragment does not exist in the predetermined region, that is, when the fragment does not pass the scissor test, the scissor tester 140 may discontinue using the input fragment. Here, discontinuing use of a fragment denotes not writing the fragment in the frame buffer 142 which will be described later, that is, not displaying the fragment as a pixel.

The frame buffer 142 may store pixel information on each pixel that can be displayed on the screen. Here, the pixel information may include, for example, a stencil value, a depth value, or color information. For this, the frame buffer 142 may include, for example, a stencil buffer (not shown), a depth buffer (not shown), and a color buffer (not shown). In this case, the stencil buffer (not shown) may store a stencil value of each pixel that can be displayed on the screen, the depth buffer (not shown) may store a depth value of each pixel that can be displayed on the screen, and the color buffer (not shown) may store color information on each pixel that can be displayed on the screen. The pixel information is information that can be acquired from the fragment. When the acquired pixel information is written in the frame buffer 142, the fragment is called a pixel, and the display unit (not shown) may display the pixel according to the written pixel information. Accordingly, herein, displaying a fragment as a pixel may mean acquiring pixel information from the fragment and writing the acquired pixel information in the stencil buffer (not shown), the depth buffer (not shown), and the color buffer (not shown).

The stencil/depth tester 144 may perform at least one of a stencil test and a depth test on the fragment input to the stencil/depth tester 144. For convenience of description, it may be assumed that the stencil/depth tester 144 performs both the stencil test and the depth test, noting that other implementations are equally available.

The stencil test may include comparing a reference value designated by a user and associated with the fragment input to the stencil/depth tester 144 with the stencil value stored in the stencil buffer (not shown). A specific meaning of passing the stencil test may be set by the user. For example, passing the stencil test may mean that the reference value exceeds the stored stencil value or the reference value is less than the stencil value.

Independent of whether the fragment input to the stencil/depth tester 144 passes the stencil test, the stencil/depth tester 144 may perform the depth test after performing the stencil test.

The depth test may include comparing a depth value of a pixel corresponding to a fragment with a depth value of a corresponding pixel stored in the depth buffer (not shown). Here, the corresponding pixel may refer to a pixel at the same position on the screen as that of the pixel corresponding to the fragment. A specific meaning of passing the depth test may be set by a user. For example, passing the depth test may mean that the depth value of the pixel corresponding to the fragment exceeds the stored depth value or the depth value of the pixel corresponding to the fragment is less than the stored depth value.

When the testing shows that the fragment input to the stencil/depth tester 144 passes the depth test, the stencil/depth tester 144 may output the input fragment to the texture mapping unit 148.

Conversely, when the testing shows that the fragment input to the stencil/depth tester 144 does not pass the depth test, the stencil/depth tester 144 may output the input fragment to the alpha tester 152 or discontinue using the input fragment. Specifically, when the input fragment passes the stencil test but does not pass the depth test, the stencil/depth tester 144 may output the input fragment to the alpha tester 152, and when the input fragment does not pass both the stencil test and the depth test, the stencil/depth tester 144 may discontinue using the input fragment.

The texture buffer 146 may store one or more texture images, and the texture mapping unit 148 may perform mapping of one or more texture coordinates to every fragment input to the texture mapping unit 148. Accordingly, texture image information on the one or more texture coordinates may be mapped to the input fragment.

The fog operator 150 may perform a fog operation on the fragment input to the fog operator 150 and may then output the fragment to the alpha tester 152. The fog operation may include changing an original color of a pixel corresponding to a fragment so as appear foggy. The fragment input to the fog operator 150 may be the fragment input from the texture mapping unit 148.

The alpha test may include comparing a reference value designated by a user and associated with the fragment input to the alpha tester 152 with an alpha value stored in the color buffer (not shown). Here, the alpha value is one of color information and may include information on transparency.

The specific meaning of passing the alpha test may be set by the user. For example, passing the alpha test may mean that the reference value exceeds the stored alpha value or the reference value is less than the stored alpha value. The alpha test is generally performed in consideration of the texture image information mapped by the texture mapping unit 148, so that the alpha test usually cannot be performed before the texture mapping. Therefore, the alpha test usually cannot belong to the second raster operations and may belong to the first raster operations.

When the testing shows that the fragment input to the alpha tester 152 passes the alpha test, the alpha tester 152 may output the input fragment to the stencil/depth value writer 154. In this case, the stencil/depth value writer 154 may write a reference value designated by a user and associated with the fragment input to the stencil/depth value writer 154 and a depth value of a pixel corresponding to the input fragment in the frame buffer 142. Specifically, when the testing of the stencil/depth tester 144 shows that the input fragment passes both the stencil test and the depth test, the stencil/depth value writer 154 may write the reference value in the stencil buffer (not shown) as a stencil value of the corresponding pixel and write the depth value in the depth buffer (not shown) as a depth value of the corresponding pixel. Accordingly, the stencil value stored in the stencil buffer and the depth value stored in the depth buffer may be updated. However, when testing of the stencil/depth tester 144 shows that the input fragment does not pass the stencil test but passes the depth test, the stencil/depth value writer 154 may write the depth value as a depth value of the corresponding pixel in the depth buffer. Accordingly, the depth value stored in the depth buffer may be updated. Similarly, when the testing of the stencil/depth tester 144 shows that the input fragment passes the stencil test and does not pass the depth test, the stencil/depth value writer 154 may write the reference value as a stencil value of the corresponding pixel in the stencil buffer. Accordingly, the stencil value stored in the stencil buffer may be updated. If the rendering apparatus according to an embodiment of the present invention performs the alpha test, the stencil/depth value writer 154 may operate after the alpha test is completed. In other words, although the fragment passes both the stencil test and the depth test, the fragment that does not pass the alpha test typically cannot be written anywhere in the frame buffer 142 and therefore cannot typically be displayed on the screen.

Conversely, when the testing shows that the fragment input to the alpha tester 152 does not pass the alpha test, the alpha tester 152 may discontinue using the input fragment.

As described above, the stencil/depth tester 144 may use the stencil value (or the depth value) stored in the frame buffer 142 in order to perform the stencil test (or the depth test). Specifically, the stencil/depth tester 144, which is to perform the stencil test, may compare a reference value designated by a user and associated with the fragment currently input to the stencil/depth tester 144 with the stencil value stored in the stencil buffer. In addition, the stencil/depth tester 144, which is to perform the depth test, may compare a depth value of a pixel corresponding to the fragment currently input to the stencil/depth tester 144 with the depth value stored in the depth buffer. Here, the stored stencil value (or the depth value) to be compared may be a stencil value (or a depth value) stored in the frame buffer 142 in a state where all operations of the pixel pipeline are performed on all fragments input to the stencil/depth tester 144 in advance.

For example, it is assumed that the stencil/depth tester 144 is to perform the depth test on an eighth fragment input to the stencil/depth tester 144, the alpha tester 152 is to perform the alpha test on a fifth fragment that is input to the stencil/depth tester 144 and passes both the stencil test and the depth test performed by the stencil/depth tester 144, the stencil/depth value writer 154 is to write the depth value of a fourth fragment which is input to the stencil/depth tester 144 and passes both the stencil test and the depth test performed by the stencil/depth tester 144 in the frame buffer 142, and the frame buffer 142 stores a depth value of a pixel corresponding to a third fragment input to the stencil/depth tester 144. In addition, a position of a pixel corresponding to the eighth input fragment on the screen is different from a position of a pixel corresponding to the fifth input fragment on the screen and the same as a position of a pixel corresponding to the fourth input fragment on the screen and a position of a pixel corresponding to the third input fragment on the screen. Here, in an embodiment it may be preferable that the stencil/depth tester 144 not compare the depth value of the pixel corresponding to the eighth input fragment with the depth value of the pixel corresponding to the third input fragment. This is because the used depth value stored in the frame buffer 142 may not be the latest updated information. Therefore, in an embodiment, it may be preferable that the stencil/depth tester 144 compares the depth value of the pixel corresponding to the eighth input fragment with the depth value of the pixel corresponding to the fourth input fragment.

The rendering apparatus according to an embodiment of the present invention may include the position comparator 156, so that the stencil/depth tester 144 may perform the stencil test (or the depth test) using the stencil value (or the depth value) stored in the frame buffer 142 having the latest updated information.

The position comparator 156 tests whether a position of a pixel on the screen corresponding to a fragment input to the position comparator 156 exists from among positions of fragments on the screen. The fragments exist in the pixel pipeline from performing an operation after a predetermined second operation (for example, the stencil test or the depth test) to performing a predetermined third raster operation (for example, the stencil value writing or the depth value writing). Here, the fragment input to the position comparator 156 may be the fragment that passed the scissor test and is input from the scissor tester 140.

When the testing shows that the position of the pixel on the screen corresponding to the fragment input to the position comparator 156, exists, the position comparator 156 may not allow the predetermined second raster operation to be performed. For example, the position comparator 156 may stop the operation of the stencil/depth tester 144.

Thereafter, the position comparator 156 may repeatedly perform the test until the testing shows that the position of the pixel on the screen corresponding to the fragment input to the position comparator 156 exists from among the positions of the fragments on the screen, which exist in the pipeline from the performing of the operation right after the predetermined second raster operation to the performing of the predetermined third raster operation.

When the testing shows that the position of the pixel on the screen, which corresponds to the fragment input to the position comparator 156, does not exist, the position comparator 156 may allow the stencil/depth tester 144 to operate.

The color information operator 158 may perform various graphics operations on color information for a pixel corresponding to a fragment input to the color information operator 158. Examples of the graphics operations include blending, dithering, and logic operations. Blending may refer to blending color information of a pixel corresponding to a fragment with the color information stored in the color buffer at a predetermined ratio. Dither may refer to increasing the number of colors of a pixel corresponding to a fragment. In addition logic operations may comprise performing a Boolean algorithm, such as an exclusive OR (XOR), in order to change the color information on a pixel corresponding to a fragment. The fragment input to the color information operator 158 may be the fragment input from the stencil/depth value writer 154. For this, the stencil/depth value writer 154 may output a fragment in which the stencil value (or the depth value) is written to the color information operator 158.

The color information writer 160 may write the color information on the pixel corresponding to the fragment input to the color information writer 160 in the color buffer. Accordingly, the color information stored in the color buffer can be updated.

The pipeline structure supported by the rendering apparatus, according to an embodiment of the present invention may be used with a so-called hierarchical Z-buffer structure. The hierarchical Z-buffer structure is disclosed in publication proceedings of SIGGRAPH, p. 231 to 238 titled "Hierarchical z-buffer visibility" by N. Greene, M. Kass and G. Miller published in August, 1993.

Figure 2:
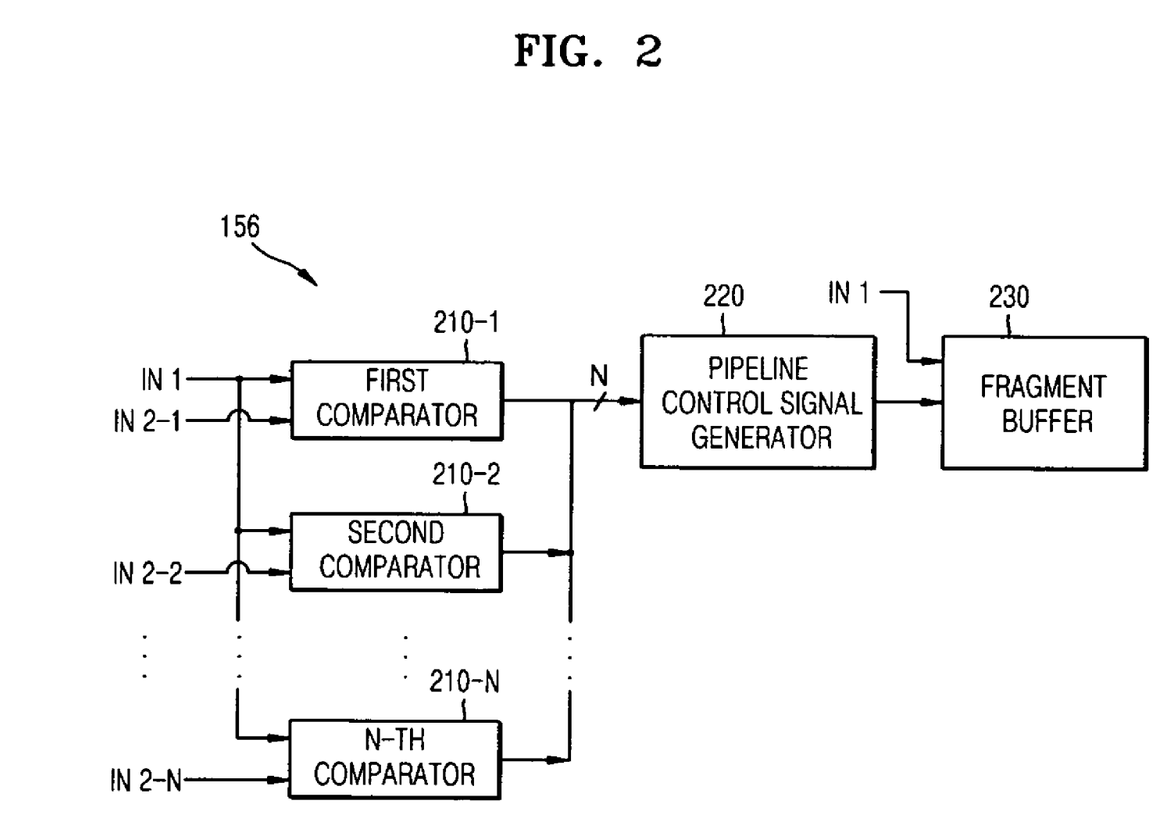
FIG. 2 illustrates a position comparator shown in FIG. 1.

FIG. 2 illustrates position comparator 156 shown in FIG. 1. The position comparator 156 may include, for example, first to $N_{th}$ comparators 210-1 to 210-N, a pipeline control signal generator 220, and a fragment buffer 230.

The $n_{th}$ comparator 210-$n$ (here, n and N may be natural numbers and have a relation of $1 \leq n \leq N$) may compare a position of the pixel on the screen corresponding to the fragment input to the position comparator 156 through an input terminal IN 1 with a position of a pixel on the screen corresponding to a fragment existing in an $n_{th}$ operation input through an input terminal IN 2-$n$.

Specifically, n shows the number of the operation performing the operation right after the predetermined second raster operation (for example, the stencil test or the depth test), and N shows the number of the operation performing the predetermined third raster operation (for example, the stencil value writing or the depth value writing) from the operation of performing the operation right after the predetermined second raster operation. Referring to FIG. 1, N is 4.

The pipeline control signal generator 220 may receive the N comparison results from the first to $N_{th}$ comparators 210-1 to 210-N. The pipeline control signal generator 220 may analyze the N comparison results and determine whether or not a position of a pixel on the screen corresponding to a fragment input through the input terminal IN 1, exists from among the positions of the fragments on the screen, which exist in the pixel pipeline from the operation of performing the operation right after the predetermined second raster operation to the operation of performing the predetermined third raster operation.

When it is determined that the position of the pixel on the screen corresponding to the fragment input through the input terminal IN 1, exists, the pipeline control signal generator 220 may generate a pipeline control signal directing that the predetermined second raster operation not to be performed. In this case, the fragment buffer 230 may store the fragment input through the input terminal IN 1.

Thereafter, the first to $N_{th}$ comparators 210-1 to 210-N and the pipeline control signal generator 220 may repeatedly operate until it is determined that the position of the pixel on the screen corresponding to the fragment input through the input terminal IN 1, does not exist from among the positions of the fragments on the screen, which exist in the pixel pipeline from the operation of performing the operation right after the predetermined second raster operation to the operation of performing the predetermined third raster operation.

When it is determined that the position of the pixel on the screen, corresponding to the fragment input through the input terminal IN 1 does not exist, the pipeline control signal generator 220 may generate the pipeline control signal for allowing the predetermined second raster operation to be performed.

Figure 3:
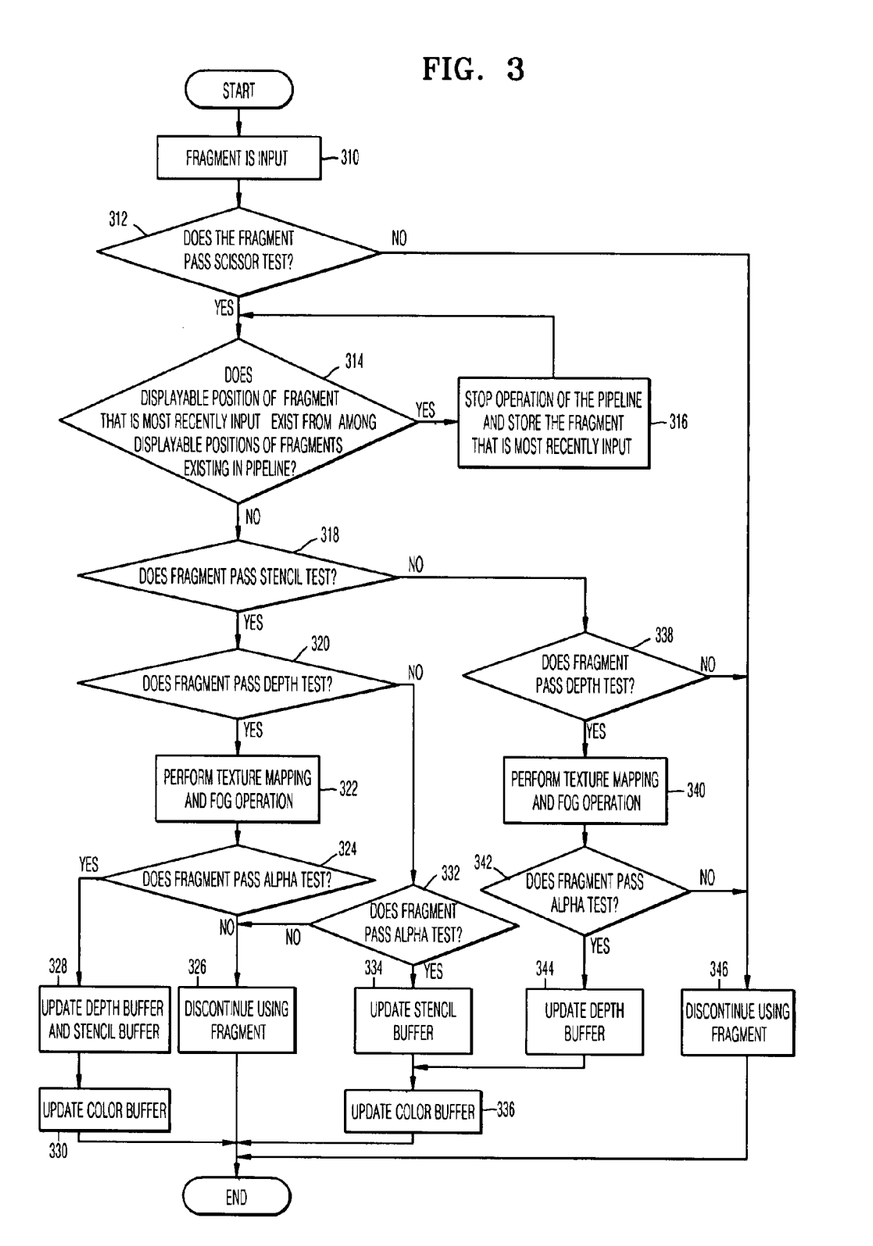
FIG. 3 illustrates a rendering method, according to an embodiment of the present invention.

FIG. 3 illustrates a rendering method, according to an embodiment of the present invention. The rendering method may include operations 310 to 346 for not performing graphics operations, which display fragments as pixels for fragments, to be tested, that cannot be displayed as pixels. Though embodiments of the present invention have and will be described with reference to particular components, with corresponding particular operations, embodiments of the present invention should not be limited thereto. Aspects of the invention may be accomplished through varying operations performed by varying components.

When a fragment is input to the pixel pipeline in operation 310, the tester 120 may test whether the fragment input in operation 310 passes the scissor test in operation 312.

When the testing shows that the fragment passes in operation 312, the tester 120 may determine whether a position of a pixel on the screen corresponding to the fragment input in operation 310 exists, from among the positions of the fragments on the screen, which exist in the pixel pipeline from the operation of performing the operation right after the predetermined second raster operation (for example, the stencil test and the depth test) to the operation of performing the predetermined third raster operation (for example, the stencil value writing and the depth value writing), in operation 314.

When it is determined in operation 314 that the position exists, the tester 120 may stop the predetermined second raster operation and temporarily store the fragment input in operation 310, in operation 316.

Conversely, when it is determined in operation 314 that the position does not exist, the tester 120 may determine whether or not the fragment input in operation 310 passes the stencil test, in operation 318.

When it is determined in operation 318 that the fragment passes the stencil test, the tester 120 may test whether the fragment input in operation 310 passes the depth test, in operation 320. When it is determined in operation 320 that the fragment passes the depth test, the fragment processor 130 may perform texture mapping and the fog operation on the fragment input in operation 310, in operation 322.

After operation 322, the tester 120 may test that the fragment input in operation 310 passes the alpha test, in operation 324.

When it is determined in operation 324 that the fragment does not pass the alpha test, the tester 120 may discontinue using the fragment input in operation 310, in operation 326.

When it is determined in operation 324 that the fragment passes the alpha test, the fragment processor 130 may update the stencil value stored in the stencil buffer and update the depth value stored in the depth buffer, in operation 328. After operation 328, the fragment processor 130 may update the color information stored in the color buffer, in operation 330.

When it is determined in operation 320 that the fragment does not pass the depth test, the tester 120 may test whether or not the fragment input in operation 310 passes the alpha test, in operation 332.

When it is determined in operation 332 that the fragment passes the alpha test, the fragment processor 130 may update the stencil value stored in the stencil buffer in operation 334 and may update the color information stored in the color buffer, in operation 336. When it is determined in operation 332 that the fragment does not pass the alpha test, the method may proceed to operation 326.

When it is determined in operation 318 that the fragment does not pass the stencil test, the tester 120 may test whether or not the fragment input in operation 310 passes the depth test, in operation 338.

When it is determined in operation 338 that the fragment passes the depth test, the fragment processor 130 may perform the texture mapping and the fog operation on the fragment input in operation 310, in operation 340.

After operation 340, the tester 120 may test whether or not the fragment input in operation 310 passes the alpha test, in operation 342. When it is determined in operation 342 that the fragment passes the alpha test, the fragment processor 130 may update the depth value stored in the depth buffer, in operation 344, and the method may proceed to operation 336. On the other hand, when it is determined in operation 342 that the fragment does not pass the alpha test, the tester 120 may discontinue using the fragment input in operation 310, in operation 346.

As described above, the rendering apparatus and method according to one or more embodiments of the present invention may perform one or more third raster operations of displaying the fragments as pixels (for example, the texture mapping and the fog operation) only after performing one or more first raster operations testing whether the fragments can be displayed as pixels (for example, the scissor test, the stencil test, and the depth test). Therefore, providing advantages in terms of efficient power consumption and rapid completion of the rendering.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A rendering method comprising:
   (a) sequentially performing one or more tests which compare a value of a pixel corresponding to a fragment input with the corresponding value of the corresponding pixel stored in a frame buffer and that test whether the fragment can be displayed as a pixel according to the comparison;
   (b) performing texture mapping on the fragment which passed at least one of the one or more tests; and
   (c) after (b) is performed, writing the value of the pixel corresponding to the fragment in the frame buffer,
   wherein the one or more tests in (a) includes at least one of a stencil test and a depth test, and the value is at least one of a stencil value and a depth value.

2. The rendering method of claim 1, wherein the rendering method further comprises:
   (a0) before (a) is performed, testing whether a position of a pixel corresponding to a fragment input to (a0) exists among positions of pixels corresponding to fragments performing operations in a pipeline from after the operations in (a) to before the operations in (c); and
   (a1) stopping the operations in (a) when the testing shows that the position of the pixel corresponding to the fragment input to (a0) exists among the positions of the pixels and repeatedly performing (a0) until the testing shows that the position of the pixel corresponding to the fragment input to (a0) does not exist among the positions of the pixels.

3. The rendering method of claim 2, wherein (a) further comprises (a2) proceeding to (a) when the testing shows that the position of the pixel corresponding to the fragment input to (a0) does not exist among the positions of the pixels.

4. The rendering method of claim 2, wherein (b) comprises:
   (b1) performing texture mapping on the fragment which passed at least one of the one or more test in (a);
   (b2) after (b1) is performed, testing whether the fragment can be displayed as a pixel according to an alpha valued stored in the frame buffer; and
   (b3) eliminating the fragments which fail to pass the testing in (b2).

5. The rendering method of claim 4, wherein the testing in (b2) is an alpha test.

6. The rendering method of claim 1, wherein the rendering method further comprises testing whether or not a position of a pixel corresponding to a fragment exists in a predetermined region to be displayed on a screen before (a) is performed and eliminating the fragment which fail to pass the testing.

7. At least one non-transitory medium comprising computer readable code to control at least one processing element to implement the method of any one of claims 1, 2, 6, 4 and 5.

8. A rendering apparatus comprising:
   a first tester performing one or more tests which compare a value of a pixel corresponding to a fragment input with the corresponding value of the corresponding pixel stored in a frame buffer and testing whether a fragment can be displayed as a pixel according to the comparison;
   a fragment processor performing texture mapping on the fragment which passed at least one of the one or more tests; and
   a pixel information writer writing the value of the pixel corresponding to the fragment in the frame buffer after texture mapping is performed,
   wherein the one or more tests in the first tester includes at least one of a stencil test and a depth test, and the value is at least one of a stencil value and a depth value.

9. The rendering apparatus of claim 8, the rendering apparatus further comprising;
   a position comparator testing whether a position of a pixel corresponding to a fragment input to the position comparator exists among positions of pixels corresponding to fragments performing operations from right after the operations in the first tester to before the operations in the pixel information writer before the one or more tests in the first tester are performed,
   wherein the position comparator stops the operations in the first tester when the testing shows that the position of the pixel corresponding to the fragment input exists among the positions of the pixels and repeatedly performs the testing in the position comparator until the testing shows that the position of the pixel corresponding to the fragment input does not exist among the positions of the pixels.

10. The rendering apparatus of claim 9, wherein the rendering apparatus further comprises a third tester testing whether the fragment can be displayed as a pixel according to an alpha value stored in the frame buffer after the texture mapping in the fragment processor is performed and eliminating the fragment which fails the testing.

11. The rendering apparatus of claim 10, wherein the third tester is an alpha test.

12. The rendering apparatus of claim 8, wherein the rendering apparatus further comprises a second tester testing whether or not a position of a pixel corresponding to a fragment exists in a predetermined region to be displayed on a screen before the one or more tests in the first tester are performed and eliminating the fragments which fail to pass the testing.

13. A rendering method comprising:
   (a) sequentially performing one or more testing raster operations which compare a value of a pixel corresponding to a fragment input with the corresponding value of the corresponding pixel stored in a frame buffer and that test whether a fragment can be displayed as a pixel from a group of testing raster operations comprised of a scissor test, a stencil test, a depth test, and a position comparator;
   (b) after (a) is performed, sequentially performing one or more raster operations selected from among a plurality of testing raster operations not belonging to the group of testing raster operations and from displaying raster operations for displaying the fragment as the pixel;
   (c) performing texture mapping on the fragment which passed at least one of the one or more tests; and
   (d) after (c) is performed, writing the value of the pixel corresponding to the fragment in the frame buffer,
   wherein the value is at least one of a scissor value, a stencil value a depth value, and a position value.

* * * * *

UNITED STATES PATENT AND TRADEMARK OFFICE
CERTIFICATE OF CORRECTION

PATENT NO.        : 8,379,050 B2
APPLICATION NO.   : 11/889629
DATED             : February 19, 2013
INVENTOR(S)       : Seok-yoon Jung et al.

It is certified that error appears in the above-identified patent and that said Letters Patent is hereby corrected as shown below:

In the Claims

Column 11, Line 38, In Claim 4, delete "valued" and insert -- value --, therefor.
Column 12, Line 58, In Claim 13, delete "value a depth value," and insert -- value, a depth value, --, therefor.

Signed and Sealed this
Twenty-eighth Day of May, 2013

Teresa Stanek Rea
*Acting Director of the United States Patent and Trademark Office*